Patented Nov. 30, 1937

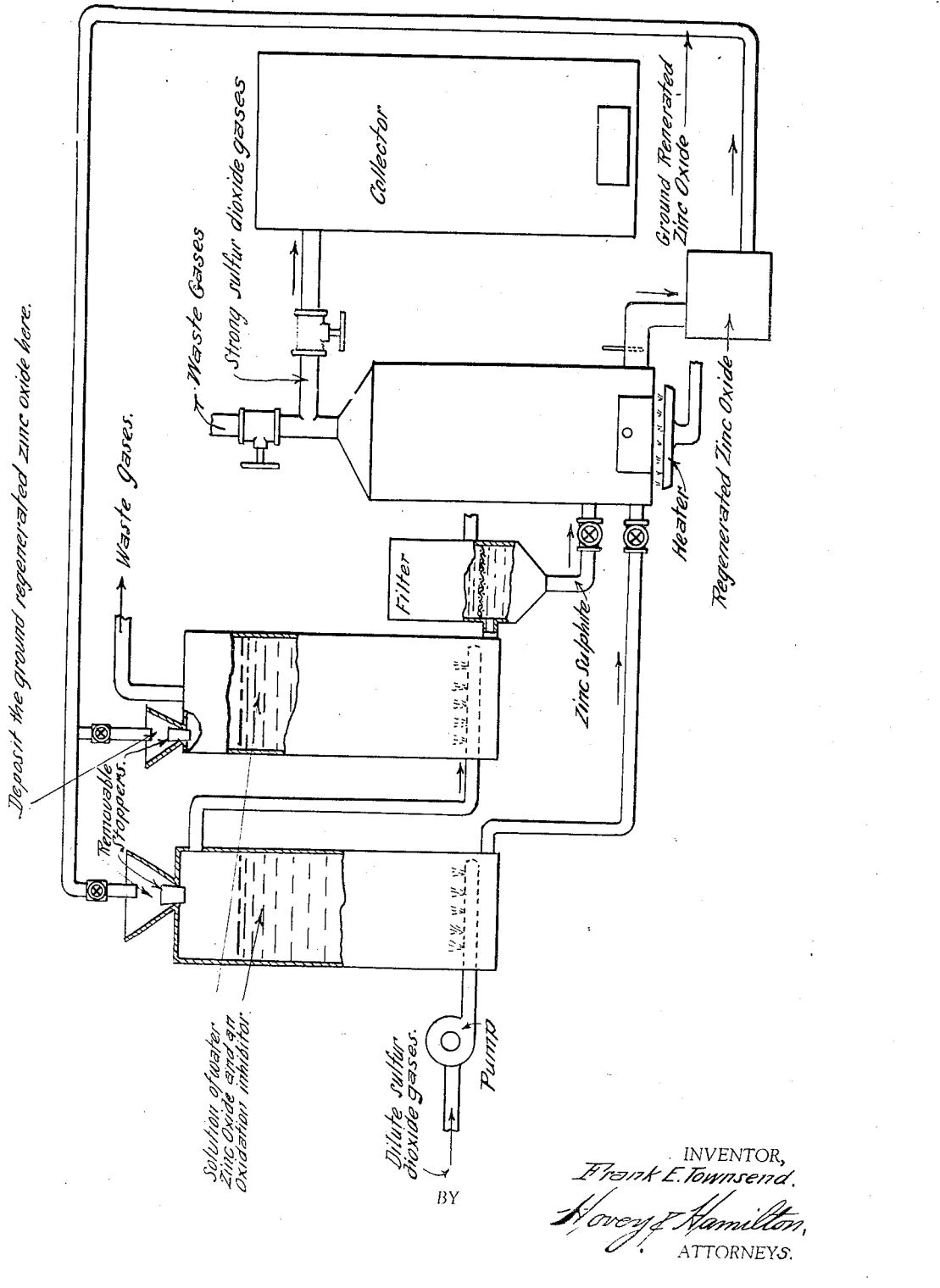

2,100,792

UNITED STATES PATENT OFFICE 2,100,792

SULPHUR DIOXIDE RECOVERY PROCESS

Frank E. Townsend, Bartlesville, Okla.

Application November 29, 1933, Serial No. 700,368

11 Claims. (Cl. 23—178)

This invention relates to an improved process for the recovery of sulphur dioxide gases from dilute sulphur dioxide and particularly to a process in which means are provided to reduce the formation of sulphates to a minimum.

The principal object of the present invention is the provision of a process for the recovery of sulphur dioxide from a gaseous mixture having sulphur dioxide present in dilute form, wherein said gases are treated with zinc oxide, an oxidation inhibitor and water to form zinc sulphite, then heating said zinc sulphite to drive off the concentrated sulphur dioxide.

Another object of the invention is the provision of a process for the recovery of sulphur dioxide from a gaseous mixture having sulphur dioxide present in a dilute form, wherein the gaseous mixture is passed through a mixture containing water, zinc oxide and a vegetable oil.

A still further object of this process is the removal of the zinc sulphate and impurities formed during the process of producing the concentrated sulphur dioxide by absorbing the concentrated solution containing said sulphate and impurities in the porous zinc oxide formed by heating the zinc sulphite. The zinc sulphite is treated with sulphur dioxide to form soluble zinc bisulphite, which is separated from the insoluble impurities by known methods. Then zinc oxide is added to precipitate the regular zinc sulphite.

Further objects will appear during the course of the specification.

Briefly stated, the process is as follows: The gases containing dilute sulphur dioxide are brought into contact with a water mixture of zinc oxide containing an oxidation inhibitor by bubbling the gases through the water mixture or by passing the gases through a tower and the mixture over the tower or by any of the known ways of bringing gases in contact with liquid mixtures. The sulphur dioxide combines with the zinc oxide to form a crystalline compound, zinc sulphite, which is substantially insoluble in water. This zinc sulphite is removed from the solution by well known methods, heated to remove water of crystallization, and further heated to a temperature sufficient to remove most of the sulphur as sulphur dioxide in a concentrated form and to regenerate zinc oxide. This zinc oxide, mixed with water containing an oxidation inhibitor, may again be brought into contact with dilute sulphur dioxide and the cycle repeated indefinitely.

The flow sheet submitted herewith represents a preferred embodiment of the above process and is believed to be self-explanatory.

This process is particularly suitable for the recovery of sulphur dioxide gas from smelter gases, roaster gases, or any other kind of mixed gases containing sulphur dioxide gas in a more or less dilute form and delivering it in a concentrated form suitable for use in the manufacture of sulphuric acid, liquid sulphur dioxide, elemental sulphur, sulphites, or bisulphites of other metals, etc.

One of the difficulties heretofore experienced in the recovery of sulphur dioxide from mixed gases is the fact that sulphites readily form sulphates due to oxidation by the oxygen of the air, also zinc sulphite readily oxidizes to zinc sulphate when it is formed, due to the oxygen which is present with the dilute sulphur dioxide gas.

The zinc sulphate thus formed is very objectionable since it accumulates in the solution and concentrates and retards the process by limiting the formation of zinc sulphite.

The zinc sulphate on further concentration by accumulation would crystallize out in the process and give trouble. It is true that under the present process which eliminates to a large degree the formation of the objectionable zinc sulphate, a certain amount of zinc sulphate is formed, and this occurs particularly when the zinc sulphite is heated to drive off the sulphur dioxide. This zinc sulphate amounts to about three to five percent of the weight of the zinc oxide residue.

The formation of zinc sulphate as stated is very objectionable since it not only uses the zinc oxide which must be replaced, but it also uses sulphur. Furthermore, it is very difficult and expensive to break up the zinc sulphate to zinc oxide and to recover the sulphur dioxide.

In the present invention it is proposed to eliminate to a large degree the formation of the objectionable zinc sulphate by combining the dilute sulphur dioxide with zinc oxide in water by including in said mixture the use of a suitable oxidation inhibitor such as oils and products produced from wood or cellulose-containing products by destructive distillation or extraction, wood products such as waste sulphite liquor, also the phenol group or a combination of phenols with other groups such as amino-phenols.

Since in most instances it is very difficult and expensive to eliminate the free oxygen during the operation of this process, it has been found much more advantageous to use an antioxidant to eliminate to a large degree the formation of objectionable zinc sulphate.

After extensive and repeated experiments to obtain an oxidation inhibitor that would not be too expensive for commercial use, the following results were obtained.

It has been found that the oils or tars from vegetation such as wood creosote oils and those obtained from fibrous or cellulose materials are good and cheap oxidation inhibitors that may be profitably used in this process. Many other organic oils might be used, but they are found to be too expensive to be of any commercial value. Waste sulphite liquor from pulp mills is a good antioxidant when used in large quantities. Specific materials tested and found to be good antioxidants are the products produced by the destructive distillation of wood and wood products, farm waste material such as corn stalks, cobs, cotton stocks and hulls, peanut shells, cane refuse, oat hulls, nut shells, weeds, grasses, etc. Or these materials themselves, finely divided and suspended in water and treated with sulphur dioxide gas, produce good antioxidants in this process, or they may be added to zinc oxide and treated with sulphur dioxide gas in the way above described.

The various inhibitors may be used separately or they may be used together, as waste sulphite liquor may be used with wood creosote oil. The waste sulphite liquor would act as inhibitor as well as keep the crystals from clinging to the packing so badly, and also furnish organic matter to help decompose zinc sulphate when it is removed from the system and heated. The exact nature of the reactions with the inhibitor is not understood. It is generally supposed that an antioxidant is itself oxidized. It is not apparent whether the decomposition of these oils, tars, etc., is due to oxidation by the oxygen in the air or to reduction by the sulphur dioxide or zinc sulphite, or both, because these oils and tars are composed of several different compounds and it is difficult to say just what the reaction is, but the fact is that these oils are broken up in the process into compounds which are themselves inhibitors.

By the destructive distillation of wood, besides oils and tars, wood alcohol and acetic acid are produced. Since the amount of wood alcohol and acetic acid is relatively small, and since alcohols are considered inhibitors, the whole distillation product could be used in this process.

None of these oils or chemicals used, entirely prevent the formation of zinc sulphate, but they greatly reduce the amount formed when used in economical quantities. The zinc sulphate formed in drying and heating the zinc sulphite, together with that formed in solution gradually accumulates. After the zinc sulphate solution becomes concentrated it must be removed from the system. This may be done by drawing off the liquid and concentrating and crystallizing, but this is very troublesome and expensive. The zinc oxide formed by heating the zinc sulphite to remove the sulphur dioxide is very porous and when added to the zinc sulphate solution absorbs some of the solution of zinc sulphate, and may absorb the zinc sulphate solution with the zinc sulphite therein up to two hundred percent of its weight.

This material can then be removed and handled as any wet material and dried and heated to break up the zinc sulphate. A reducing agent aids in the decomposition of zinc sulphate to zinc oxide and sulphur dioxide. If waste sulphite liquor is used, the carbon compounds will aid in decomposing the sulphate. The zinc oxide can then be returned to the system, or the zinc sulphate solution may be removed from the circuit and added to the zinc oxide and heated as above mentioned.

After the solution becomes concentrated in zinc sulphate, the regenerated zinc oxide should not be added directly to the solution as lumps or hard particles are formed. It is best to grind the oxide in water or weak zinc sulphate solution before adding it to the strong sulphate solution. It may also be ground with the concentrated liquor but it forms the zinc sulphite better when the oxide is saturated with the weaker solution. Some water will have to be added any way to replace that removed as water of crystallization.

It is desired not to limit the amount of inhibitor to any particular percentage, but to be permitted in each instance to use the proper amount to facilitate proper economic operation of the process. The quantity of the inhibitor varies with the materials used, and each specific case must receive special attention, by actual tests, to determine the most efficient mixture.

Furthermore, the rate of passing the gas through the water mixture varies, due to the changing conditions of the materials, and their tendency to act differently under the different conditions.

After the zinc sulphite has been formed and removed from the solution it is first heated to about 100° C. to drive off the water of crystallization. During this operation a small percent of the sulphur is driven off as sulphur dioxide. Upon further heating of the dried zinc sulphite to from 250° to 300° C. it begins to rapidly lose its sulphur in the form of sulphur dioxide. As the gas is driven off, it leaves a residue of light and porous zinc oxide resembling pumice stone, but much softer. This zinc oxide may be returned to the system after passing it through a grinder. The use of the zinc oxide may thus be continued indefinitely by this method.

While this process, the treating of the zinc oxide with sulphur dioxide, is best carried on at higher temperatures, not to exceed 100° C.; however, it may also be carried on at temperatures below 100° C. to a good advantage.

Zinc oxide has been designated for use in this process; however, other compounds of zinc, such as zinc carbonate, or zinc hydroxide might be used. The sulphur dioxide in water would break up the carbonate and hydroxide to form zinc sulphite. Also, roasted zinc ore could be used as a source of zinc oxide. The ore would contain more impurities, which would act as catalysts to increase the amount of zinc sulphate, but the inhibitor would largely counteract this catalytic action.

Gases from zinc smelters, etc. usually contain objectionable elements such as cadmium. Cadmium sulphate exchanges its sulphate radical with zinc sulphite forming zinc sulphate and cadimum sulphite. This cadmium sulphite upon being heated oxidizes to cadmium sulphate, so unless the cadmium sulphate is removed it will cause trouble due to the formation of too much zinc sulphate. The zinc oxide residue obtained during this process may be treated with water to remove this troublesome cadmium sulphate.

By this general method it is also possible to recover zinc oxide from impure roasted ores or metallurgical products by producing a zinc bisulphite, which is soluble in water, with an oxidation inhibitor, then adding zinc oxide to precipitate the regular zinc sulphite, by a known method. Then heat to form sulphur dioxide and zinc oxide as explained above.

It is submitted that the process as set forth operates to concentrate sulphur dioxide from dilute sulphur dioxide gases without forming an objectionable amount of zinc sulphate, to remove economically the zinc sulphate that is formed, and a process that is efficient and inexpensive due to the use of new and novel oxidation inhibitors which have not been used in similar processes.

What I claim as new and novel and desire to protect by Letters Patent is:

1. The process for recovering sulphur dioxide from dilute sulphur dioxide gases which consists in treating said gases with a mixture of zinc oxide, a vegetable oil produced by the destructive distillation of fibrous vegetable material and water to form zinc sulphite, then heating said zinc sulphite to drive off sulphur dioxide in concentrated form.

2. The process of recovering sulphur dioxide from dilute sulphur dioxide gases which consists in treating said gases with a mixture of water, zinc oxide and an oil produced by the destructive distillation of wood or cellulose-containing products, to produce zinc sulphite, then heat-treating said zinc sulphite to drive off the sulphur dioxide in concentrated form.

3. The process of recovering sulphur dioxide from dilute sulphur dioxide gases which consists in treating said gases with a mixture of water, zinc oxide and a zinc sulphite oxidation inhibitor containing a wood creosote oil to produce zinc sulphite, removing the zinc sulphite from the solution and subjecting it to heat to drive off the sulphur dioxide in concentrated form and to regenerate the zinc oxide.

4. The process for recovering sulphur dioxide from dilute sulphur dioxide gases which consists in treating said gases with a mixture of water, zinc oxide and distillate from the destructive distillation of wood to produce zinc sulphite, then removing the zinc sulphite from the solution and subjecting it to heat to drive off the sulphur dioxide and to regenerate the zinc oxide.

5. The process for recovering sulphur dioxide from dilute sulphur dioxide gases which consists in treating said gases with a mixture of water, zinc oxide and wood creosote oil to produce zinc sulphite, then removing the zinc sulphite from the solution and heating said zinc sulphite to drive off sulphur dioxide in a concentrated form, then removing the resultant zinc sulphate which had accumulated in the zinc sulphite solution by absorbing the concentrated solution in the porous zinc oxide formed by heating the zinc sulphite.

6. The process of recovering sulphur dioxide from dilute sulphur dioxide gases which consists in treating said gases with a mixture of water and zinc oxide in the presence of the gaseous products produced by the destructive distillation of vegetation to produce zinc sulphite, then removing the zinc sulphite from the solution and subjecting it to heat to drive off the sulphur dioxide and to regenerate the zinc oxide.

7. The process of recovering sulphur dioxide from dilute sulphur dioxide gases which consists in treating said gases with a mixture of water and zinc oxide in the presence of an oxidation inhibitor consisting of oil produced by the destructive distillation of vegetation to produce a metal sulphite, then heating said metal sulphite to drive off sulphur dioxide in a concentrated form.

8. The process of recovering sulphur dioxide from dilute sulphur dioxide gases, which consists in treating said gases with a mixture of water, zinc oxide and an oxidation inhibitor consisting of the distillation products of the destructive distillation of vegetable matter, to form zinc sulphite; removing the zinc sulphite and heating it to remove the sulphur dioxide and form a porous zinc oxide; absorbing any zinc sulphate formed in this porous oxide; then heating the porous zinc oxide to a high temperature to break up the zinc sulphate into sulphur dioxide and zinc oxide.

9. The process for recovering sulphur dioxide from dilute sulphur dioxide gases which consists in treating said gases with a mixture of water, zinc oxide and a zinc sulphite oxidation inhibitor consisting of oil produced by the destructive distillation of vegetation, to form zinc sulphite; separating the zinc sulphite from the solution and heating to remove the sulphur dioxide and regenerate the zinc oxide; then grinding the regenerated zinc oxide in water and adding it to the treating solution then containing concentrated zinc sulphate.

10. The process of recovering sulphur dioxide from dilute sulphur dioxide gases which consists in treating said gases with a mixture of water, zinc oxide and a tar formed by the destructive distillation of vegetable matter, to form a zinc sulphite; separating the zinc sulphite from the solution and heating it to remove the sulphur dioxide and regenerate the zinc oxide; then grinding the regenerated zinc oxide in a relatively dilute zinc sulphate solution and adding it to the treating solution then containing concentrated zinc sulphate, to produce a solution for further treatment of dilute sulphur dioxide gases.

11. The process for recovering sulphur dioxide from dilute sulphur dioxide gases which consists in combining said sulphur dioxide with zinc oxide in water in the presence of an oil obtained from cellulose material which substantially prevents the oxidation of said zinc sulphite to zinc sulphate, to produce zinc sulphite, and heating said zinc sulphite to liberate the sulphur dioxide in concentrated form.

FRANK E. TOWNSEND.